Figure 1:
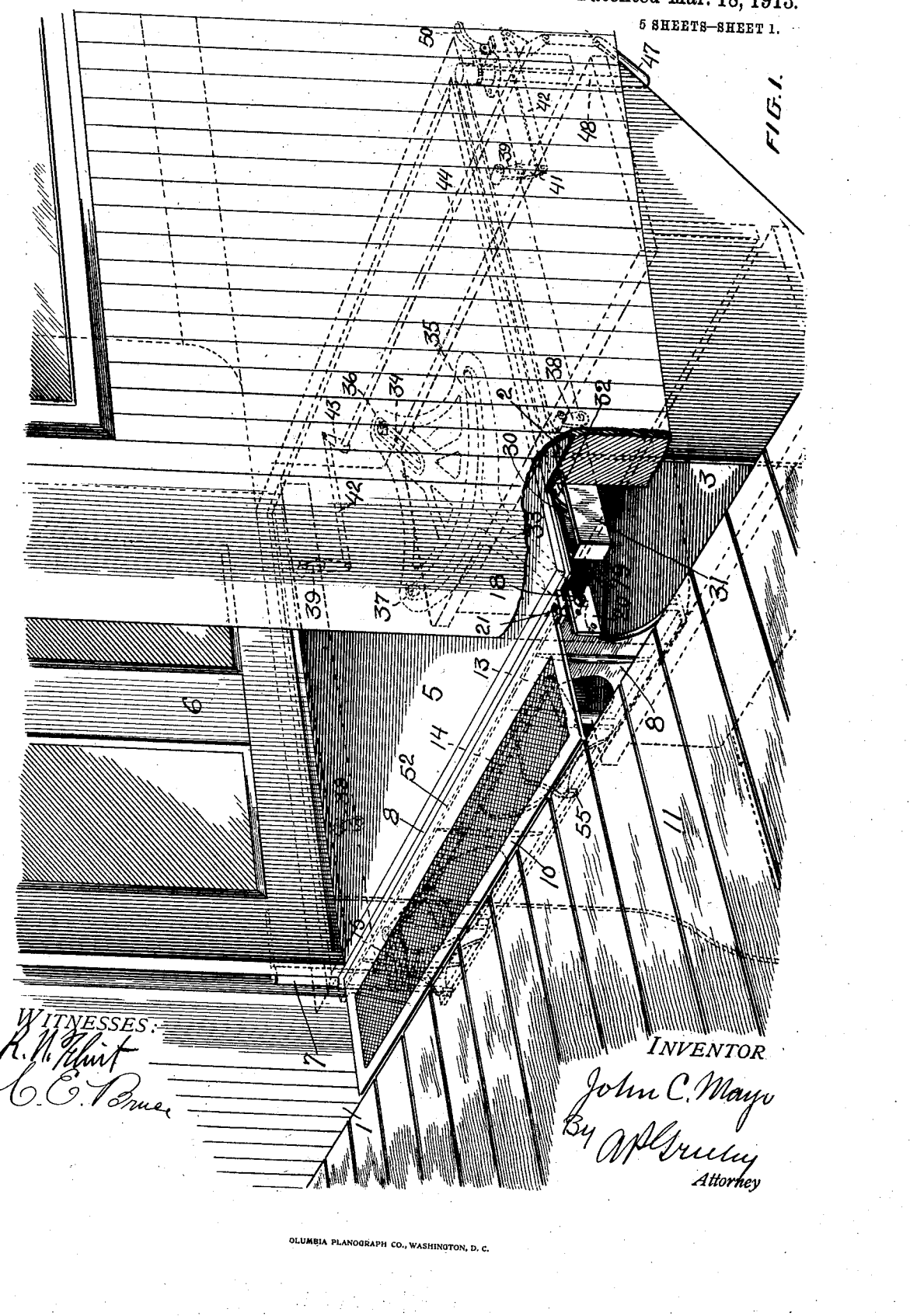

J. C. MAYO.
CAR PLATFORM EXTENSION.
APPLICATION FILED MAY 12, 1910. RENEWED JUNE 15, 1911.

1,056,038.

Patented Mar. 18, 1913.

5 SHEETS—SHEET 4.

WITNESSES:

INVENTOR
John C. Mayo
BY
Attorney

J. C. MAYO.
CAR PLATFORM EXTENSION.
APPLICATION FILED MAY 12, 1910. RENEWED JUNE 15, 1911.
1,056,038.
Patented Mar. 18, 1913.
5 SHEETS—SHEET 5.
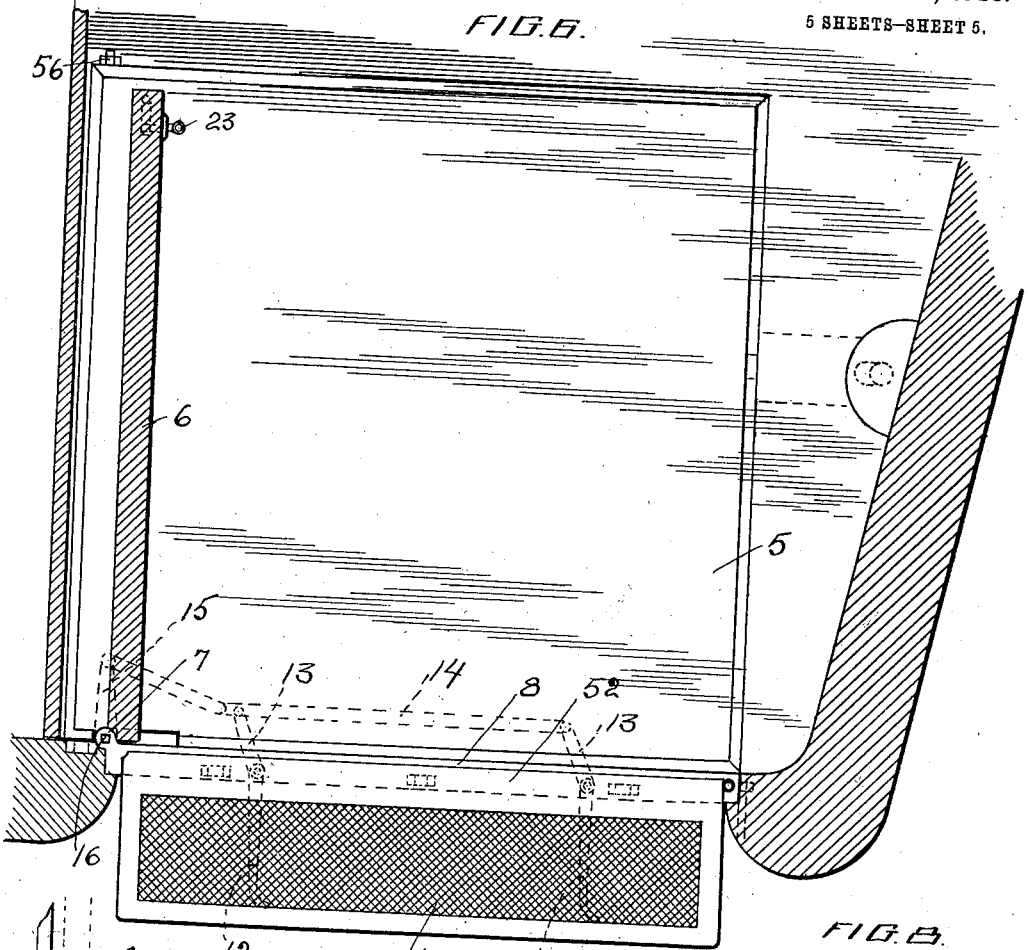
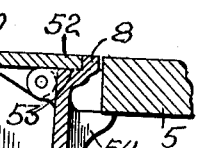
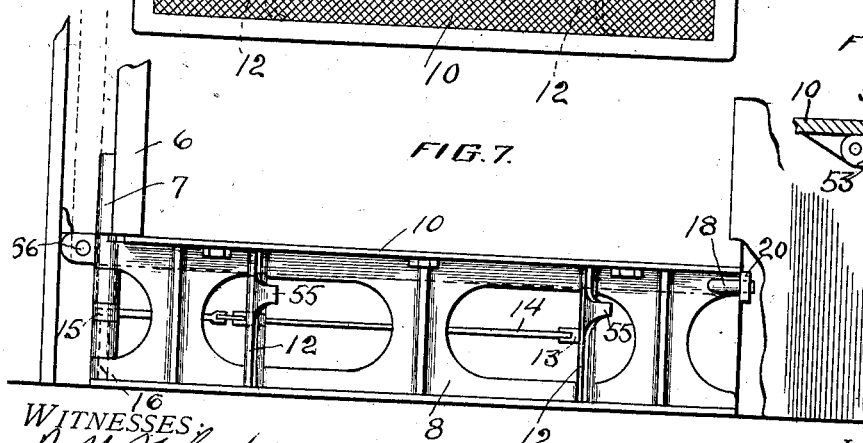
INVENTOR
John C. Mayo
Attorney

UNITED STATES PATENT OFFICE.

JOHN C. MAYO, OF WASHINGTON, DISTRICT OF COLUMBIA.

CAR-PLATFORM EXTENSION.

1,056,038. Specification of Letters Patent. Patented Mar. 18, 1913.

Application filed May 12, 1910, Serial No. 560,988. Renewed June 15, 1911. Serial No. 633,345.

*To all whom it may concern:*

Be it known that I, JOHN C. MAYO, a citizen of the United States, residing at Washington, in the District of Columbia, have invented certain new and useful Improvements in Car-Platform Extensions, of which the following is a description, reference being had to the accompanying drawings, forming a part hereof.

My invention relates to platform extension devices for railway cars and has for its object to provide improvements in such devices and particularly to provide means for bridging the space which is found to exist in some cases between the edge of the platform or the outer end of the plate commonly used in vestibule cars to form an extension of the car platform over the car steps, and the edge of the station platform.

In the vestibule cars commonly in use on the railways when the train is in motion the car steps are covered by a hinged plate similar to a trap door extending level with the surface of the car platform to the vestibule door forming what may be termed a platform extension and in most cases up to recent years it has been necessary to first swing this hinged plate or trap door upward against the end of the car and then open the door when the train stops, to permit the use of the car steps by those desiring to enter or leave the car, the station platform being commonly below the lowermost car step. In recent years it has been recognized that where large numbers of passengers are to enter or leave the cars they can do so more rapidly if the station platform is on a level with the car platform. But for the reason that the change of the level of the station platform has been made only at few stations it is still necessary to provide for the use of the car steps at stations where the station platform is below their level.

By arranging the vestibule door to swing over the platform extension so that it may be opened while the platform extension still remains in place over the car steps, it is made possible for passengers or others to enter or leave the car from or onto a station platform on the level of the car platform, while by turning up the platform extension or otherwise moving it out of its position over the car steps the steps may be made use of at stations where the low station platform is found.

In adapting vestibule cars to permit them to be used in connection with station platforms on the level of the car platforms it has been found that the vestibule cars of certain railways are less wide than those of other railways and that when such narrower cars come into a station having its station platform on the level of the car platform, the space to be entered by the car being necessarily as wide as the wide cars a gap or space is left between the outer edge of the platform extension and the edge of the station platform. Such space or gap is also left even with the wide cars in cases where the track at the station is curved and the platform is correspondingly curved. Of course the same space or gap is left where the cars are built without steps and the platform extended as a permanent structure to the vestibule door.

The invention consists in the means hereinafter described for bridging the space or gap above referred to, the means hereinafter described for operating such bridging means and the combinations of elements hereinafter described and particularly pointed out in the claims.

Figure 2:
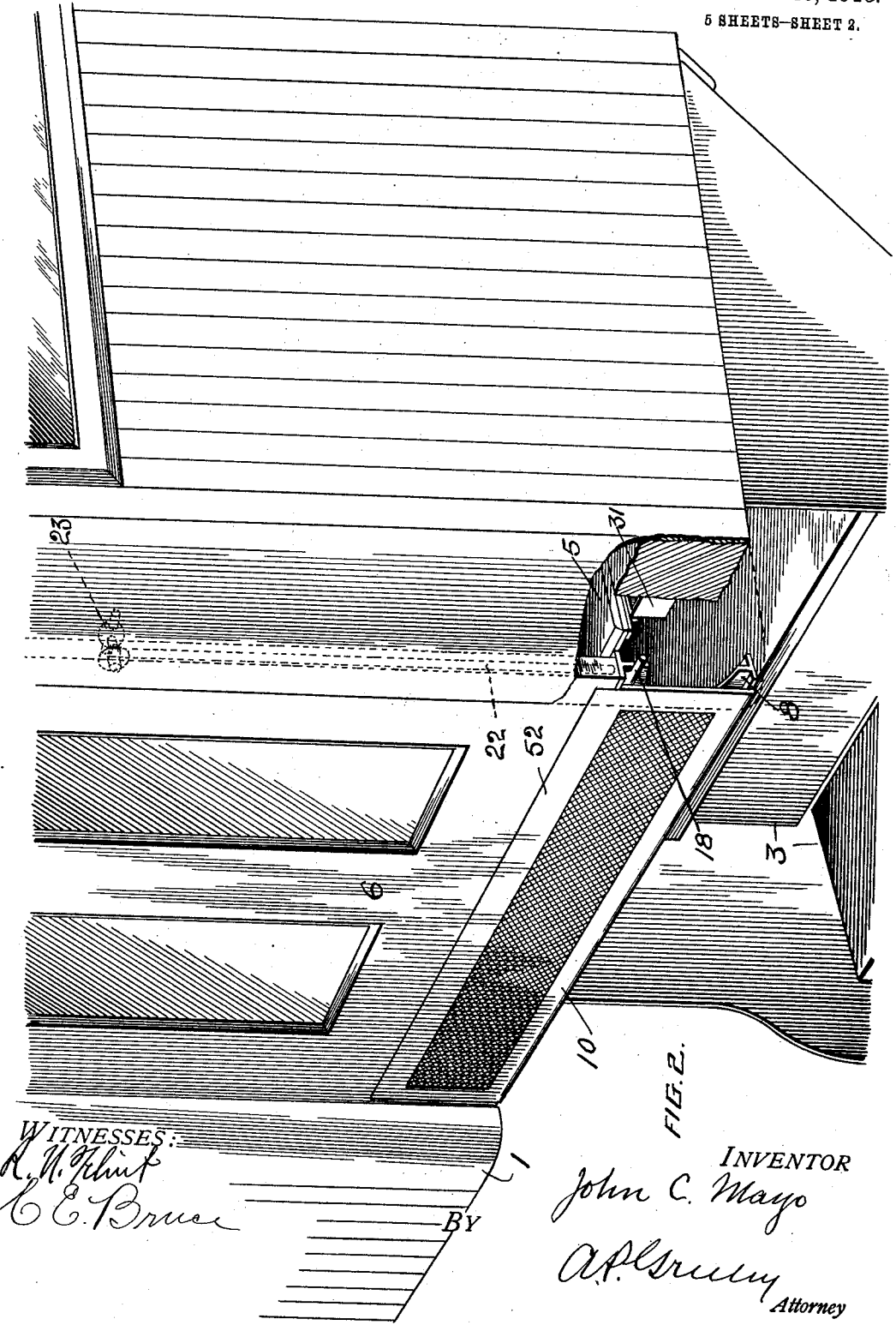
Figure 3:
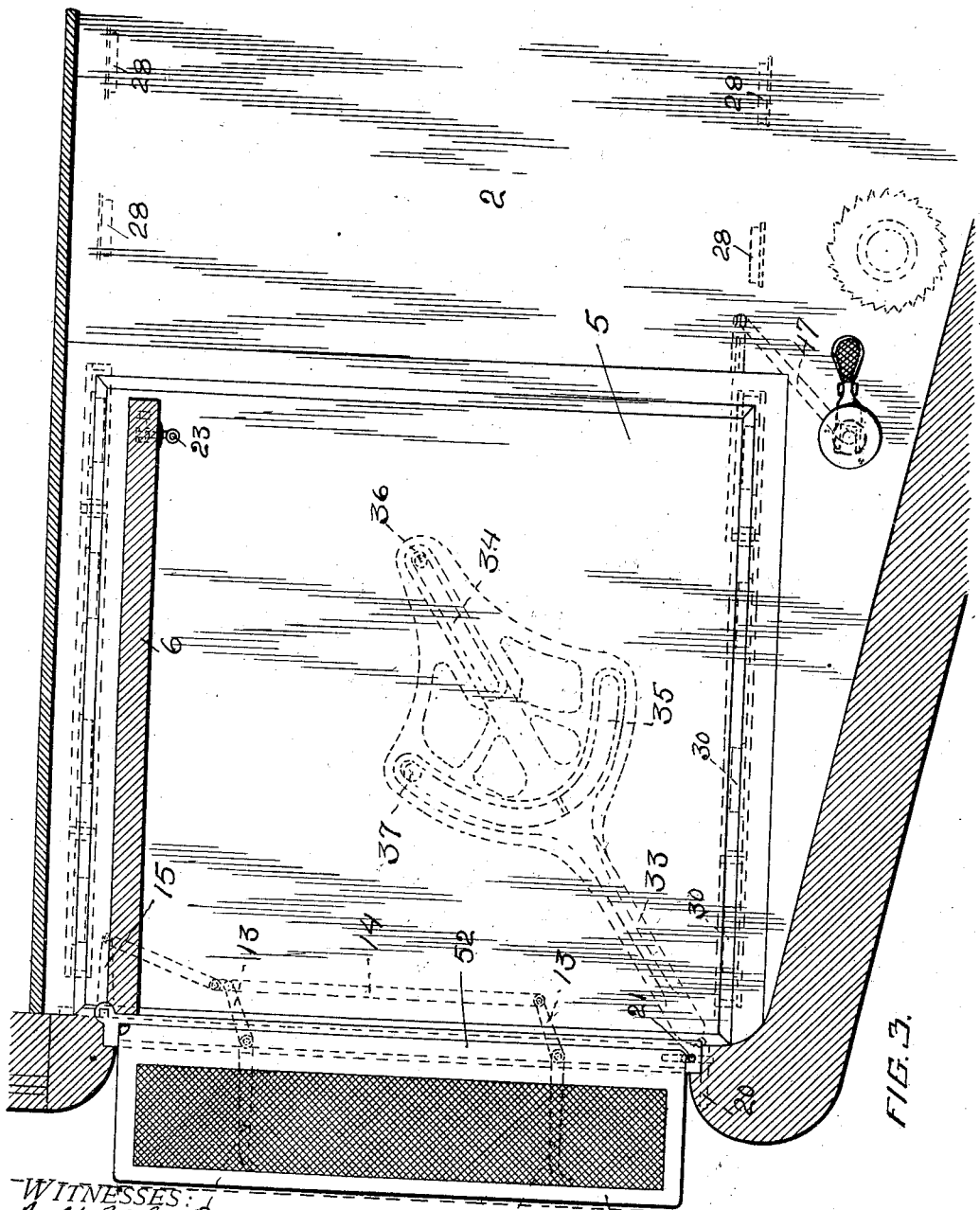
Figure 4:
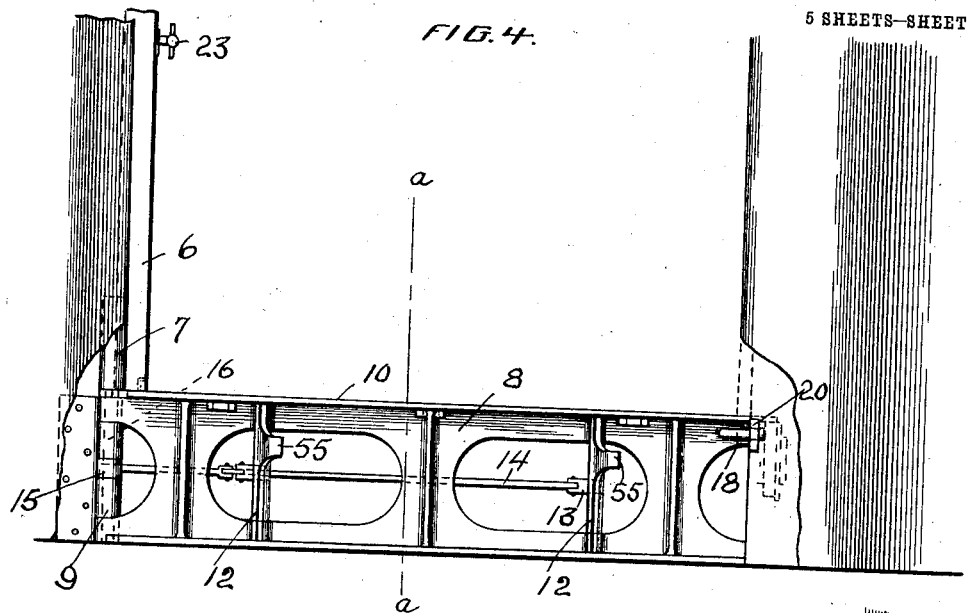
Figure 5:
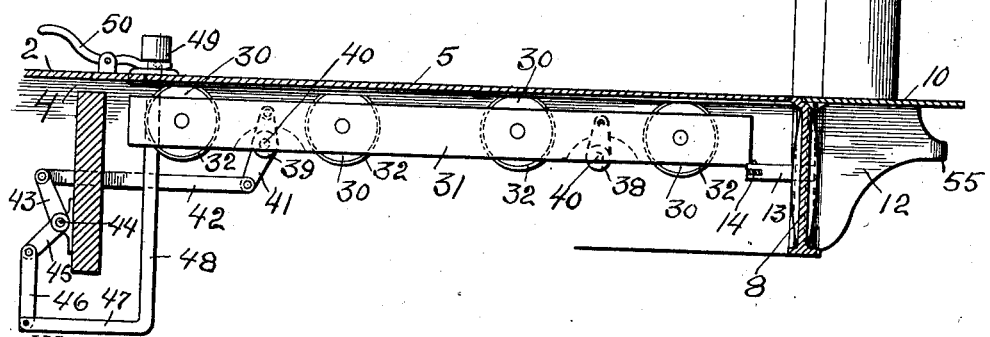

In the drawings: Figure 1 is a perspective view of a car platform having the present invention applied thereto the bridging means being shown in position for use. Fig. 2 is a similar view showing the bridging device in the position which it assumes when the vestibule door is closed. Fig. 3 is a horizontal sectional view on a plane slightly above the platform. Fig. 4 is a front view of the bar which carries the hinged leaf and its connections. Fig. 5 is a vertical section on line *a—a* of Fig. 4 showing one of the frames which carry the rollers which support the platform extension and also showing the means for raising the platform extension. Fig. 6 is a horizontal sectional view on a plane slightly above the car platform showing a construction adapted for use with a hinged platform extension. Fig. 7 is a front view of the construction shown in Fig. 6 and Fig. 8 is a detail sectional view of the bar 8 which carries the hinged leaf and its connection with the bar, as shown in elevation in Figs. 4 and 7.

Referring to the drawings 1 indicates the body of a railway car, 2 indicates the platform and 3 indicates the steps. The platform 2 and car steps 3 are of usual construction except that in the preferred construction a space 4 immediately beneath the platform is provided to receive the sliding platform extension 5.

6 indicates the vestibule door hinged at 7 to the end of the car body and having its lower end slightly above the level of the top of the platform extension so that the door when opened will swing over the platform extension when the latter is in position over the car steps.

Immediately below the level of the under face of the platform extension 5 a bar 8 extends across the space above the car steps. This bar 8 is hinged at one end to the end of the car body its hinge 9 being in line with the hinge 7 of the door 6. The other end of the bar 8 is supported against sagging when in position across the space above the car steps by means of a pin 18 engaging a slot 19 in a plate 20 on the frame-work of the car.

Hinged to the bar 8 at or near its upper edge is a leaf 10 which when swung into raised position extends horizontally outward to form a continuation of the platform extension 5 and to bridge the space between the outer end of the platform extension and the edge of the station platform 11. This leaf 10 is swung into raised position and supported in raised position by brackets 12 hinged or pivoted to the bar 8 on vertical axes. The brackets 12 are provided with rearwardly extending arms 13 which pass through openings in the bar 8 and have their ends connected by a horizontal rod 14 the end of which is connected with a horizontal arm 15 carried by a vertical rod 16 which forms the pintle of the hinge 9 of the bar 8. At its upper end the vertical rod 16 is so connected with the door 6 as to turn with it.

When the bar 8 is in position across the space above the car steps with its free end locked, the inward swing of the door 6 as it is opened will, through the vertical rod 16 its arm 15 and the rod 14, cause the brackets 12 to swing on their pivots and raise the leaf 10 into horizontal position. When the door is again closed the brackets 12 will be turned so as to lie flat against the bar 8 and the leaf 10 will drop by its own weight into vertical position.

When it is desired to make use of the car steps it is of course necessary to move the platform extension 5 so as to uncover them and also to swing the bar out of the way. The platform extension may be arranged as in vestibule cars commonly in use at the present time, to be swung upward against the end of the car body as shown in Fig. 6 but is preferably arranged to slide beneath the car platform as hereinafter described. The bar 8 is arranged to be unlocked and to be so connected to the door 6 as to swing with it in opening and closing. In thus swinging with the door the leaf 10 will not be raised since the vertical rod 16 and the parts operated by it will swing with the bar 8 and will consequently not operate to raise the leaf.

When the platform extension 5 is in position over the car steps its outer edge is against the inner upper edge of the bar 8 thus holding the bar 8 locked. When the platform extension is in retracted position the bar 8 is free to be swung inward on its hinge 9. For the purpose of swinging it inward it is provided on its upper edge near its free end with a bolt hole 21 adapted to receive the lower end of a bolt rod 22 carried by the door 6 and vertically movable thereon by a handle 23.

When the door 6 is to be opened while the platform extension is in position over the car steps the handle 23 is turned in a direction to withdraw the end of rod 22 from the bolt hole 21 when the door may be swung inward without moving the bar 8, but as above described causing the leaf 10 to be swung upward. When the bar 8 is to be swung inward to permit the car steps to be used the end of the bolt rod 22 is allowed to remain in engagement with the bolt hole 21 and as the door is swung inward, the platform extension 5 being moved into retracted position either before the door is opened or simultaneously with the opening of the door as in the preferred construction, the bar 8 will swing inward with the door the leaf 10 remaining flat against the outer face of the bar.

The platform extension 5 as above stated is preferably arranged to slide into and out of position over the car steps. In order to permit this to be done the platform extension is mounted to slide on rollers 30 carried by frames 31 secured to the frame of the car at opposite sides of the space above the car steps. These frames 31 are preferably arranged to be vertically movable in the manner and for the purpose hereinafter explained but may be fixed if preferred. The rollers 31 are preferably provided with flanges 32 which engage the side edges of the platform extension and prevent it from lateral movement. Stationary rollers 28 support the platform extension when retracted into the space 4 beneath the car platform.

For the purpose of sliding the platform extension into and out of position it is connected with the door 6 by means of an arm 33 pivoted at one end to the bar 8 near its free end and connected near its other end to the platform extension. The end portion of the arm 33 which is connected to the platform extension is provided with a longitudinal slot 34 and a curved slot 35 of the form shown in Fig. 3 substantially on the curve of a parabola. The arm 33 is beneath the platform extension and is connected to its under side by pins 36 and 37 extending through the slots 34 and 35 respectively. These pins 36 and 37, as shown in Fig. 3, are arranged on the median line of the platform extension, that is on a line parallel with the sides of the platform extension midway between the sides.

When the bar 8 is connected to the door 6 by the vertical bolt rod 22 as above described and the door opened carrying the bar with it the arm 33 will slide the platform extension back into the space 4 beneath the car platform leaving the car steps uncovered. As the door 6 is swung back into closed position the arm 33 will draw the platform extension back with it into position over the car steps.

In order that the car platform extension may enter the space 4 it must be supported on a plane below the surface of the car platform while being moved into and out of this space. If the frames 31 carrying the rollers 32 are fixed in position the platform extension when in position over the car steps will have its upper surface below the upper surface of the car platform. It is desirable to avoid this difference in levels of the top surfaces of the car platform and the platform extensions and for this purpose the frames 31 carrying the rollers 32 are preferably arranged to be vertically movable.

The means for raising and lowering the platform extension here shown comprises on each of the frames 31, levers 38 and 39 pivoted at 40 to the frame of the car and having their upper ends pivoted to the frame 31. The lever 39 has an arm 41 extending below its pivot and connected by rod 42 with an arm 43 of a rock shaft 44 located beneath the car platform and extending lengthwise thereof. This rock shaft is provided near one end with an arm 45 the free end of which is connected by a link 46 to an arm 47 of a vertically movable rod 48 which preferably extends up through the end sill or other part of the car platform and is provided above the level of the car platform with a collar 49. A foot lever 50 pivoted on the car platform has one end adapted to engage this collar from beneath and has its other end adapted to be pressed by the foot of the person operating the device.

The levers 38 and 39 are so arranged that the movement caused by depressing the vertical rod 48 as far as possible will swing the levers 38 and 39 slightly past the perpendicular line passing through their pivots 40 so that having once been moved to this position they will remain until positively moved and will sustain the frames 31 and through them the platform extension 5 in elevated position. In order to release the levers 38 and 39 the foot lever 50 is operated to lift the vertical rod 48 sufficiently to swing the levers past the perpendicular. The weight of the frames 31 and platform extension will then swing the levers downward until the platform extension is in position to enter the space 4.

The leaf 10 is preferably hinged to the bar 8 slightly below its upper end so as to leave the upper edge 52 of the leaf slightly above the upper edge of the bar (see Fig. 8). When the leaf is swung down and the door 6 is closed the lower edge of the door will bear against this upper edge 52 and will serve to keep the leaf from swinging when the train is in motion. The upper edge of the bar 8 is provided with a recess or rabbet adapted to receive the upper edge 52 of the hinged leaf when the leaf is swung to horizontal position. The bar 8 is preferably provided on its inner face with a bracket or brackets 54 adapted to support the outer end of the platform extension when the latter is in position above the car steps. The hinged brackets 12 are preferably provided with extensions 55 below the upper edge of the brackets adapted to contact with the leaf 10 some distance below its hinge and thus aid in swinging it upward into horizontal position.

In Figs. 6 and 7 I have shown the platform extension hinged at 56 to the end of the car and adapted to be swung up against the end of the car when it is desired to use the car steps.

It will of course be understood that I do not desire to be limited to the precise construction and arrangement of parts herein shown and described, as it is obvious that many changes in details of construction and arrangement may be made without departing from the spirit of the invention.

Having thus described my invention and explained the operation thereof, I claim and desire to secure by Letters Patent:—

1. The combination with a car platform of a platform extension movable into and out of position to over-lie the car steps, a leaf adapted to form a continuation of the platform extension and means for moving said leaf into and out of position to form such continuation of the platform extension.

2. In a vestibule car, the combination with a car platform of a platform extension movable into and out of position to over-lie the car steps, a leaf, adapted to form an extension of the platform extension and means operated by the vestibule door for moving said leaf into and out of position to form such extension of the car platform extension.

3. The combination with a car platform, of a platform extension adapted to over-lie the car steps, a bar extending across the space above the car steps at the outer end of the platform extension, a leaf carried by the bar adapted to extend outward therefrom to form a continuation of the platform extension and means for moving the leaf into and out of position to form such continuation of the platform extension.

4. In a vestibule car, the combination with a car platform, of a platform extension adapted to over-lie the car steps, a bar extending across the space above the car steps at the outer end of the platform extension, a leaf carried by the bar adapted to extend outward therefrom to form a continuation of the platform extension and means operated by the vestibule door for moving the leaf into and out of position to form such continuation of the platform extension.

5. The combination with a car platform, of a platform extension adapted to over-lie the car steps, a bar adapted to extend across the space above the car steps at the outer end of the platform extension and adapted to be moved into and out of such position, a leaf carried by the bar adapted to extend outward therefrom to form a continuation of the platform extension and means for moving the leaf into and out of position to form such continuation of the platform extension.

6. In a vestibule car, the combination with a car platform, of a platform extension adapted to over-lie the car steps, a bar adapted to extend across the space above the car steps at the outer end of the platform extension and adapted to be moved into and out of such position, a leaf carried by the bar adapted to extend outward therefrom to form a continuation of the platform extension and means operated by the vestibule door for moving the leaf into and out of position to form such continuation of the platform extension.

7. The combination with a car platform, of a platform extension adapted to over-lie the car steps, a bar hinged at one end adapted to extend across the space above the car steps at the outer end of the platform extension and adapted to be swung into and out of such position, a leaf carried by the hinged bar adapted to extend outward therefrom to form a continuation of the platform extension, means for swinging the hinged bar into and out of position, and means for moving the leaf into and out of position to form a continuation of the platform extension.

8. In a vestibule car, the combination with a car platform, of a platform extension adapted to over-lie the car steps, a bar hinged at one end adapted to extend across the space above the car steps at the outer end of the platform extension and adapted to be swung into and out of such position, a leaf carried by the hinged bar adapted to extend outward therefrom to form a continuation of the platform extension, means operated by the vestibule door for swinging the hinged bar into and out of position and means also operated by the vestibule door for moving the leaf into and out of position to form a continuation of the platform extension.

9. The combination with a car platform, of a platform extension adapted to over-lie the space above the car steps, a bar extending across the space above the car steps at the outer end of the platform extension, a leaf hinged to the bar arranged to be capable of being swung into position to form a continuation of the platform extension and means for swinging the leaf into position.

10. The combination with a car platform, of a platform extension adapted to over-lie the space above the car steps, a bar hinged at one end extending across the space above the car steps at the outer end of the platform extension, a leaf hinged to the bar arranged to be capable of being swung into position to form a continuation of the platform extension and means for swinging the leaf into position.

11. The combination with a car platform, of a platform extension adapted to over-lie the space above the car steps, a bar hinged at one end extending across the space above the car steps at the outer end of the platform extension, a leaf hinged to the bar arranged to be capable of being swung into position to form a continuation of the platform extension, means for swinging the leaf into position, and means for swinging the bar into and out of position.

12. In a vestibule car, the combination with a car platform, of a platform extension adapted to over-lie the space above the car steps, a vestibule door adapted to swing over the platform extension, a bar extending across the space above the car steps at the outer end of the platform extension, a leaf hinged to the bar arranged to be capable of being swung into position to form a continuation of the platform extension, and means operated by the door for swinging the leaf into position.

13. In a vestibule car, the combination with a car platform extension adapted to overlie the space above the car steps, a vestibule door adapted to swing over the platform extension, a bar hinged at one end extending across the space above the car steps at the outer end of the platform extension, a leaf hinged to the bar arranged to be capable of being swung into position to form a continuation of the platform extension, means operated by the door for swinging the leaf into position and means also operated by the door for swinging the bar into and out of position.

14. In a vestibule car, the combination with the car platform, of a platform extension adapted to over-lie the car steps and arranged to be movable into and out of position, a hinged bar adapted to extend across the space above the car steps at the outer end of the platform extension, a leaf carried by the hinged bar adapted to be moved into and out of position to form a continuation of the platform extension, means adapted to be operated by the hinged bar for moving the platform extension into and out of position, means adapted to be operated by the vestibule door for swinging the hinged bar into and out of position, and means also adapted to be operated by the vestibule door to move the leaf into and out of position to form a continuation of the platform extension.

15. In a vestibule car, the combination with a car platform of a platform extension adapted to over-lie the car steps and arranged to be movable into and out of position, a bar extending across the space above the car steps in line with and below the vestibule door, and a leaf hinged to the bar adapted to form a continuation of the platform extension when swung into horizontal position, said leaf having an edge portion above its hinge adapted to be engaged by the vestibule door.

16. In a vestibule car, the combination with a car platform of a platform extension adapted to over-lie the car steps and arranged to be movable into and out of position, a bar extending across the space above the car steps in line with and below the vestibule door, and a leaf hinged to the bar adapted to form a continuation of the platform extension when swung into horizontal position, said leaf having an edge portion above its hinge adapted to be engaged by the vestibule door and means operated by the vestibule door to move the leaf into and out of position to form a continuation of the platform extension.

17. In a vestibule car, the combination with the car platform, of a platform extension adapted to over-lie the car steps and arranged to be movable into and out of position, a bar extending across the space above the car steps in line with and below the vestibule door and having a longitudinal recess along its outer upper edge, and a leaf hinged to the bar adapted to form a continuation of the platform extension when swung into horizontal position, said leaf having an edge portion above its hinge adapted to enter said recess when the leaf is in horizontal position and to be engaged by the door when the leaf is in vertical position.

18. In a vestibule car, the combination with the car platform, of a platform extension adapted to over-lie the car steps and movable into and out of position, a hinged bar extending across the space above the car steps at the end of the platform extension, and a leaf carried by the bar adapted to be swung into position to form a continuation of the platform extension, the upper inner edge of the hinged bar being so located that it will be engaged by the outer end of the platform extension and the hinged bar thus locked against movement while the platform extension is in position over the car steps.

19. The combination with a car platform, of a platform extension adapted to over-lie the car steps and movable into and out of position, a bar adapted to extend across the space above the car steps at the outer end of the platform extension and hinged at one end, the platform extension and hinged bar being so arranged that the outer end of the platform extension, when the platform extension is in position over the car steps, will abut against the hinged bar and hold it against movement.

20. The combination with a car platform, of a platform extension adapted to over-lie the car steps and movable into and out of position, a bar adapted to extend across the space above the car steps at the outer end of the platform extension and hinged at one end, means for supporting the free end of the hinged bar, the platform extension and hinged bar being so arranged that the outer end of the platform extension, when the platform extension is in position over the car steps, will abut against the hinged bar to hold its free end in engagement with its supporting means.

21. The combination with a car platform, of a platform extension adapted to over-lie the car steps and movable into and out of position, a bar adapted to extend across the space above the car steps at the outer end of the platform extension and hinged at one end, the platform extension and hinged bar being so arranged that when the platform extension is in position over the car steps its outer end will abut against the hinged bar and hold it against movement, and means operated by the hinged bar for moving the platform extension into and out of position.

22. The combination with a car platform, of a platform extension adapted to over-lie the car steps and slidable into and out of position, a bar adapted to extend across the space above the car steps at the outer end of the platform extension and hinged at one end, the platform extension and hinged bar being so arranged that when the platform extension is in position over the car steps its outer end will abut against the hinged bar and hold it against movement, and means operated by the hinged bar for sliding the platform extension into and out of position.

23. The combination with a car platform, of a platform extension adapted to overlie the car steps and mounted to be slidable into and out of position, a hinged member adapted to extend across the space above the car steps at the outer end of the platform extension and means for sliding the platform extension into and out of position comprising an arm pivotally connected at one end to the hinged member near its free end the arm having formed therein near its end a longitudinally arranged slot and also having formed therein a curved slot crossing the longitudinal line of the arm and pins carried by the platform extension and engaging said slots.

24. The combination with a car platform, of a platform extension adapted to over-lie the car steps and mounted to be slidable into and out of position, a hinged member adapted to extend across the space above the car steps at the outer end of the platform extension and means for sliding the platform extension into and out of position comprising an arm pivotally connected at one end to the hinged member near its free end the arm having formed therein near its end a longitudinally arranged slot and also having formed therein a curved slot crossing the longitudinal line of the arm having its concave side toward the longitudinal slot, and pins carried by the platform extension and engaging said slots.

25. The combination with a car platform of a platform extension adapted to over-lie the car steps and mounted to be slidable into and out of position, a hinged member adapted to extend across the space above the car steps at the outer end of the platform extension and means for sliding the platform extension into and out of position comprising an arm pivotally connected at one end to the hinged member near its free end, the arm having formed therein near its end a longitudinally arranged slot and also having formed therein a slot curved on the lines of a parabola crossing the longitudinal line of the arm, and pins carried by the platform extension engaging said slots.

26. The combination with a car platform, of a platform extension adapted to over-lie the car steps and mounted to be slidable into and out of position, a hinged member adapted to extend across the space above the car steps at the outer end of the platform extension and means for sliding the platform extension into and out of position comprising an arm pivotally connected at one end to the hinged member near its free end, the arm having formed therein near its end a longitudinally arranged slot and also having formed therein a slot curved on the lines of a parabola crossing the longitudinal line of the arm, and pins carried by the platform extension engaging said slots, the pins being arranged on the median line of the platform extension.

27. The combination with a car platform having an open space beneath it, of a platform extension adapted to over-lie the car steps and arranged to be drawn out into position over the car steps and to be slid back into the space beneath the car platform, means in the space beneath the car platform for supporting the platform extension and movable means arranged in the space above the car steps adapted when in raised position to support the platform extension with its upper surface on a level with the upper surface of the car platform.

28. The combination with a car platform having an open space beneath it, of a platform extension adapted to over-lie the car steps and arranged to be drawn out into position over the car steps and to be slid back into the space beneath the car platform, means in the space beneath the car platform for supporting the platform extension and movable means arranged in the space above the car steps adapted when in raised position to support the platform extension with its upper surface on a level with the upper surface of the car platform comprising frames at opposite sides of the space above the car steps carrying rollers and means for simultaneously raising the frames.

29. The combination with a car platform having an open space beneath it, of a platform extension adapted to over-lie the car steps and arranged to be drawn out into position over the car steps and to be slid back into the space beneath the car platform, of rollers arranged to support the platform extension and having flanges engaging its edges to guide it in its movement.

JOHN C. MAYO.

In the presence of—
R. M. PARKINS,
A. P. GREELEY.

---

Copies of this patent may be obtained for five cents each, by addressing the "Commissioner of Patents, Washington, D. C."